UNITED STATES PATENT OFFICE.

RAGNAR IVERSEN, OF CHRISTIANIA, NORWAY.

SOLDER FOR METALS, PARTICULARLY ALUMINIUM.

1,332,899. Specification of Letters Patent. Patented Mar. 9, 1920.

No Drawing. Application filed October 27, 1919. Serial No. 333,691.

*To all whom it may concern:*

Be it known that I, RAGNAR IVERSEN, a subject of the King of Norway, residing at Christiania, Norway, have invented certain new and useful Improvements in Solders for Metals, Particularly Aluminium, of which the following is a specification.

The object of the present invention is a composition of metals or an alloy which is specially fit for soldering parts or pieces of aluminium but can also be employed in soldering other metals.

The novel means for soldering has the following composition: tin, zinc, copper, aluminium and manganese. These substances are melted together and formed to ingots or bars.

A suitable proportion is the following:

| | | |
|---|---|---|
| 41.000 kg | | tin. |
| 27.750 " | | zinc. |
| 3.000 " | | copper. |
| 0.100 " | | aluminium. |
| 0.600 " | | manganese. |

Experiments made show that this alloy produced in the correct manner gives an excellent result, the soldering being perfectly durable and does not suffer any change in the course of time.

Having thus described my invention, I claim:—

A solder metal, particularly for aluminium, and comprising a composition of tin, zinc, copper, aluminium and manganese, substantially in the proportions specified.

In testimony whereof I affix my signature in presence of two witnesses.

RAGNAR IVERSEN.

Witnesses:
ROBERT H. FRAZIER,
A. N. HEDENSCHOW.